(12) United States Patent
McKenzie

(10) Patent No.: US 7,022,153 B2
(45) Date of Patent: Apr. 4, 2006

(54) APPARATUS AND METHOD FOR THE REMOVAL OF MOISTURE AND MISTS FROM GAS FLOWS

(76) Inventor: John R. McKenzie, Box 602, Raymond, Alberta (CA) T0K 2S0

( * ) Notice: Subject to any disclaimer, the term of this patent is extended or adjusted under 35 U.S.C. 154(b) by 104 days.

(21) Appl. No.: 10/772,328

(22) Filed: Feb. 6, 2004

(65) Prior Publication Data

US 2004/0154272 A1    Aug. 12, 2004

Related U.S. Application Data

(60) Provisional application No. 60/445,450, filed on Feb. 7, 2003.

(51) Int. Cl.
*B01D 45/12* (2006.01)

(52) U.S. Cl. .......................... 55/423; 55/426; 55/459.1

(58) Field of Classification Search ................. 55/423, 55/426, 456, 459.1, 434, 436, 440
See application file for complete search history.

(56) References Cited

U.S. PATENT DOCUMENTS

| | | | | |
|---|---|---|---|---|
| 821,172 A | * | 5/1906 | Kjerner | ....................... 55/426 |
| 1,789,613 A | * | 1/1931 | Walker | ......................... 55/419 |
| 3,631,657 A | * | 1/1972 | Wilson | ......................... 55/348 |
| 3,877,904 A | * | 4/1975 | Lowrie | ......................... 96/189 |
| 2003/0106292 A1 | * | 6/2003 | Kitano et al. | ................. 55/396 |

FOREIGN PATENT DOCUMENTS

JP          09-290113 A    * 11/1997

OTHER PUBLICATIONS http://www.natco.ab.ca/Products/Gas/Pt_WhirlyScrub_I.asp—1998.

* cited by examiner

*Primary Examiner*—Frank M. Lawrence

(57) ABSTRACT

Apparatus and method is provided for capturing centrifugally-liberated liquid from a gas stream including separator components installed in a cyclonic vessel. A plurality of concentric shells supported on a base form annular cavities arranged about a gas outlet for capturing separated liquids from a spinning gas stream. The shells can be suspended from an insert manufactured with or retrofit to a vessel. Helical vanes aid in maintaining the spinning gas stream. In low moisture conditions, liquid removal through annular cavities can be supplemented with an annular layer of packing adjacent the vessel wall.

18 Claims, 6 Drawing Sheets

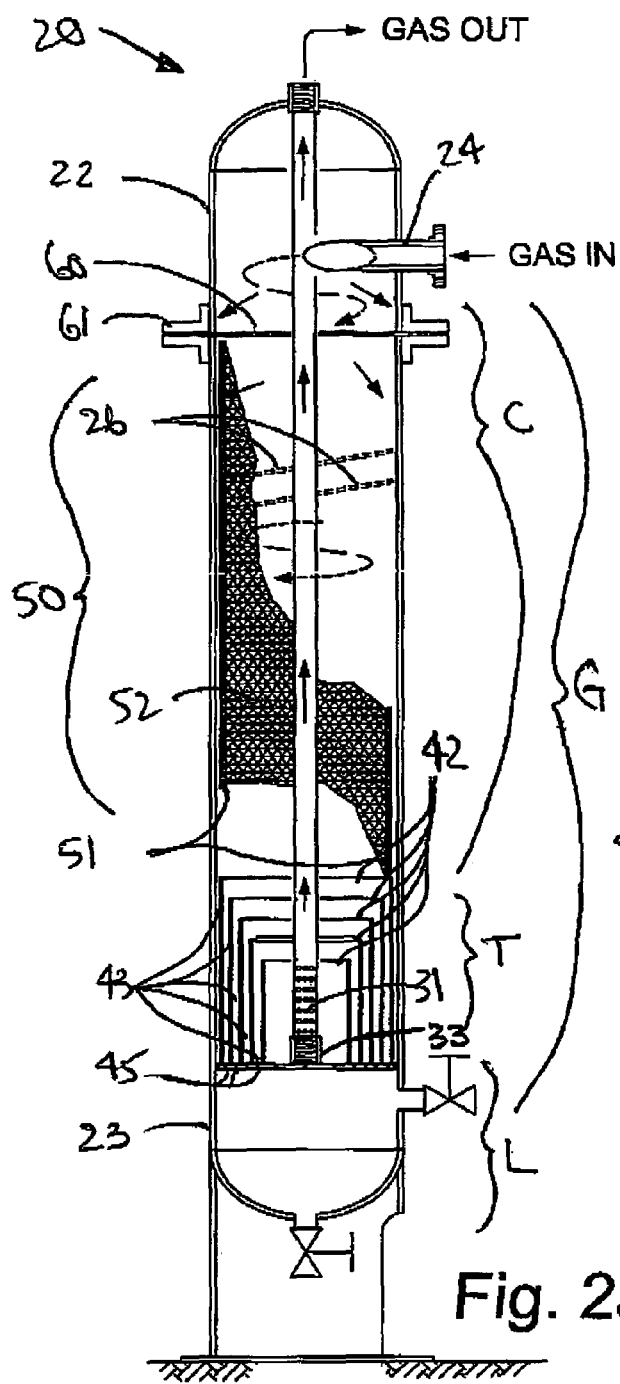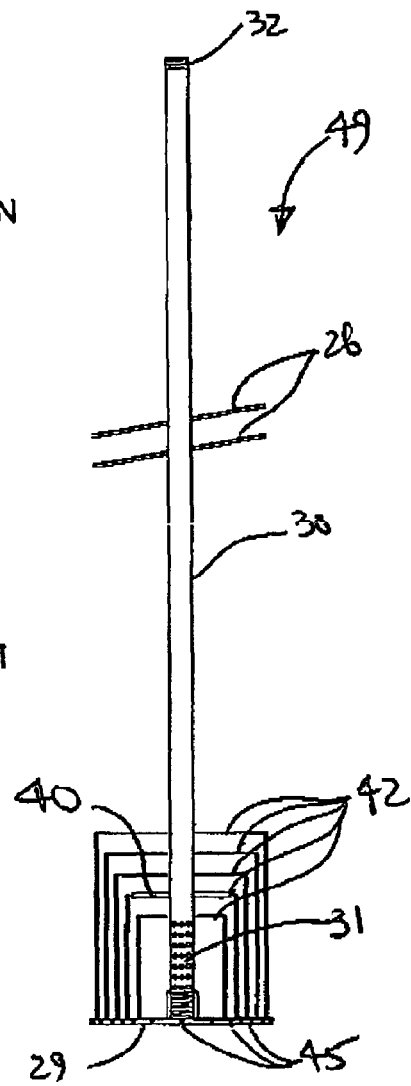
Fig. 2a
Fig. 2b

A-A

APPARATUS AND METHOD FOR THE REMOVAL OF MOISTURE AND MISTS FROM GAS FLOWS

CROSS REFERENCE TO RELATED APPLICATION

This application claims priority of U.S. Provisional Patent Application Ser. No. 60/445,450, filed on Feb. 7, 2003, the entirety of which is incorporated herein by reference.

FIELD OF THE INVENTION

The invention relates generally to apparatus for removing small amounts of liquids from a gas stream. More particularly, cyclonic operation aids in the removal of moisture from compressed air and moisture and mists from gas streams such as wellhead gas effluent.

BACKGROUND OF THE INVENTION

Downstream condensation and formation of hydrates can be a serious problem in gas processing. Liquids include water vapor (moisture) and liquid hydrocarbon mist. In some cases, simple centrifugal separator vessels are implemented which are capable of gross removal but result in substantial moisture or liquid re-entrainment. Dehydrators are applied for the removal of water vapor from hydrocarbon gas streams. Dehydrators, such as those implementing glycol, are capable of greater moisture removal, however they are also associated with a large cost and negative environmental impact including a large energy cost associated with heating to separate water and glycol and the exhaust emissions.

Applicant has determined that there is a novel approach to the removal of liquids which demonstrates improved efficiency without the need for additional energy consumption and emissions.

SUMMARY OF THE INVENTION

Methodology and apparatus are applied for the removal of liquids from gas streams including compressed air and gas from gas wells.

Apparatus is provided for better capturing centrifugally-liberated liquid from such gas streams so as to prevent re-entrainment and thereby achieve greater removal. In one embodiment, the present invention comprises components for a cyclonic vessel. The components can be conveniently provided as an insert to a manufactured vessel or as a retrofit to an existing vessel.

In one form of the present invention, a tangential gas inlet imparts a cyclonic spin to incoming wet gas. A plurality of concentric shells are placed adjacent the gas outlet at the discharge of the cyclonic vessel for capturing separated liquids before re-entrainment. Liquid collects in annular cavities for draining out of the vessel. Helical vanes can be added for enhancing or maintaining the spinning of the gas stream. In low moisture conditions, the shells can be supplemented with an annular layer of high surface area contacting material at the vessel wall.

In a broad embodiment, apparatus for treating a gas stream containing liquid is adapted to a vessel having cylindrical side walls, a bottom end, and a tangential gas inlet adjacent a top end. The apparatus comprises: a base plate positioned below the tangential gas inlet; at one least cylindrical shell arranged on the base plate and adjacent the wall portion for forming at least one annular cavity extending upwardly from the base plate and having an open upper end for receiving liquid therein; an opening in the base plate at each annular cavity for draining liquid from the at least one annular cavity; an outlet for the gas stream positioned adjacent the base plate and within the annular shells; and a plate above the gas outlet for directing the gas stream over the one or more annular cavities before the gas stream is removed through the gas outlet.

Preferably the base plate and shells are includes as part of an insert installed into a sectional vessel having a tangential gas inlet.

BRIEF DESCRIPTION OF THE DRAWINGS

FIG. 2a is a cross-sectional view of a separator according to one embodiment of the invention which illustrates a separation insert installed in a gas processing vessel. An optional annular blanket is only shown partially to improve clarity of the other components;

FIG. 2b is a cross sectional view of the insert of FIG. 2a, illustrated isolated from the vessel prior to insertion into the vessel and having optional helical vanes thereon for spinning the downcoming wet gas stream. The optional mist pad has been omitted for clarity;

DETAILED DESCRIPTION OF THE PREFERRED EMBODIMENT

Figure 1:
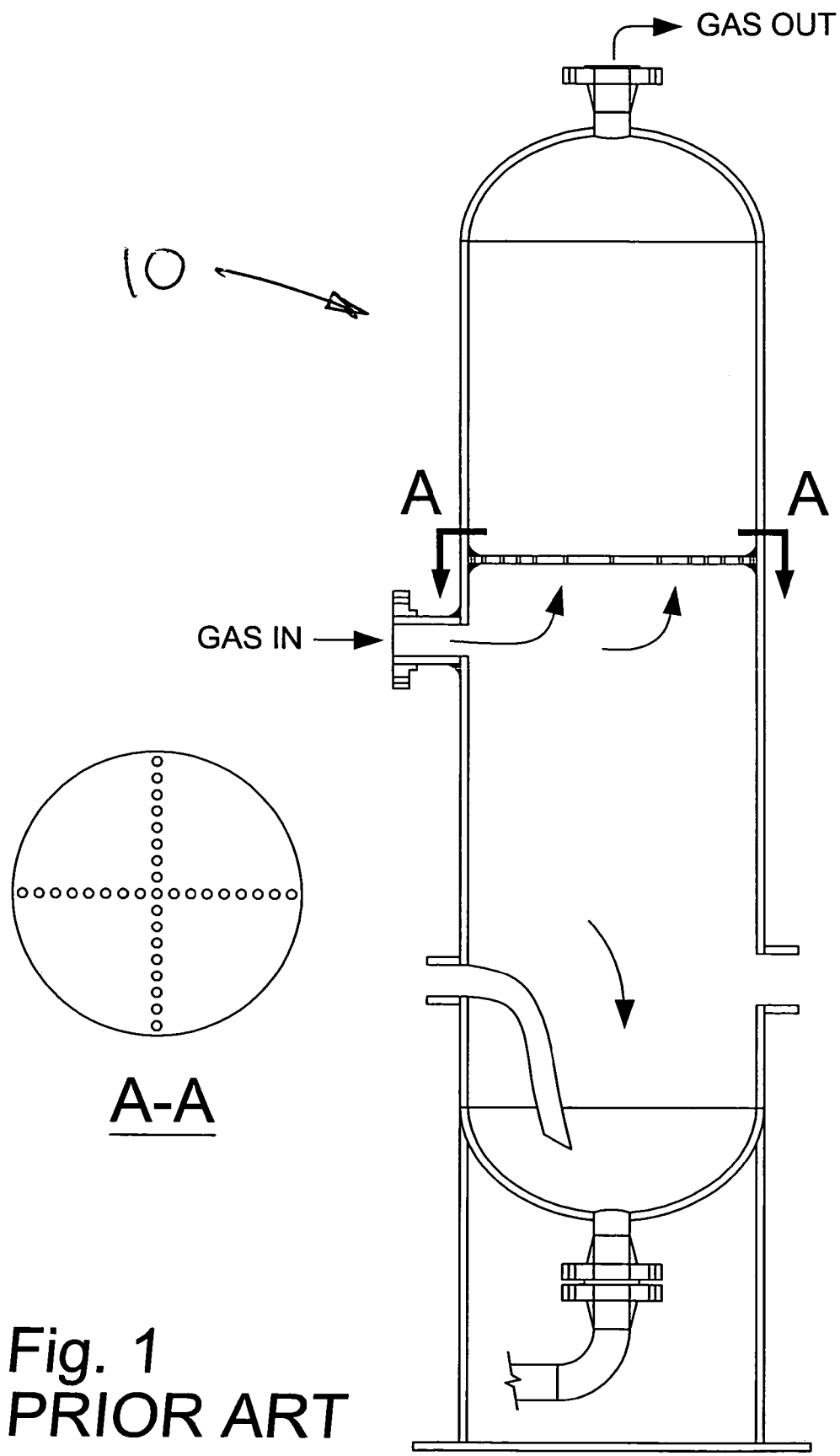
FIG. 1 is a substantially conventional prior art surge vessel for primary separation of wet gas from solids.

One embodiment of the separator 20 is shown in FIGS. 2a–4b. The separator 20 is particularly well adapted to treatment of wellhead gas streams containing hydrocarbon mists and moisture. Typically, the incoming gas stream is initially and conventionally treated in a surge separator 10 (FIG. 1) where gross removal of impurities and solids from the wet gas stream is required.

The wet gas stream containing liquid is then directed tangentially through one or more separators 20 of the present invention.

Figure 3B:
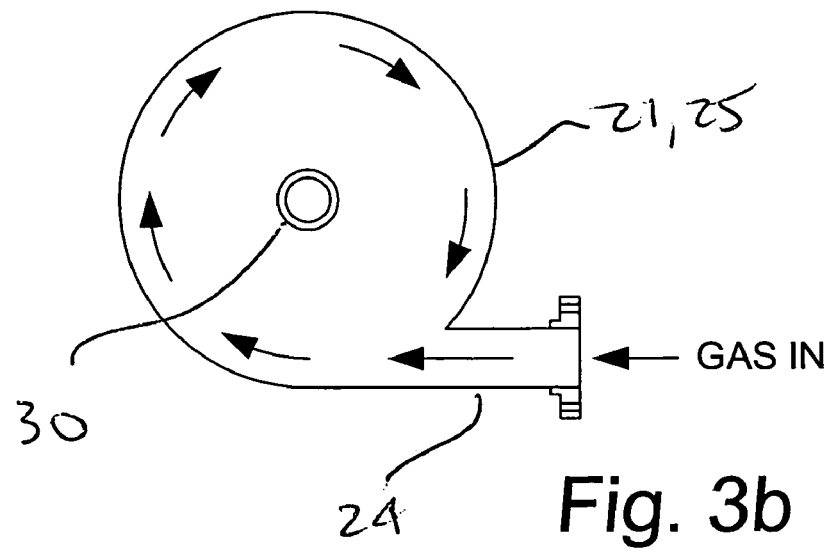
FIGS. 3a and 3b are side and top cross-sectional views respectively of a top portion of the vessel of FIG. 2a illustrating the dry gas discharge conduit, dry gas exit, the tangential wet gas inlet, and the top of the vessel being flanged for enabling installation and maintenance of the insert of FIG. 2b as required.
Figure 3A:
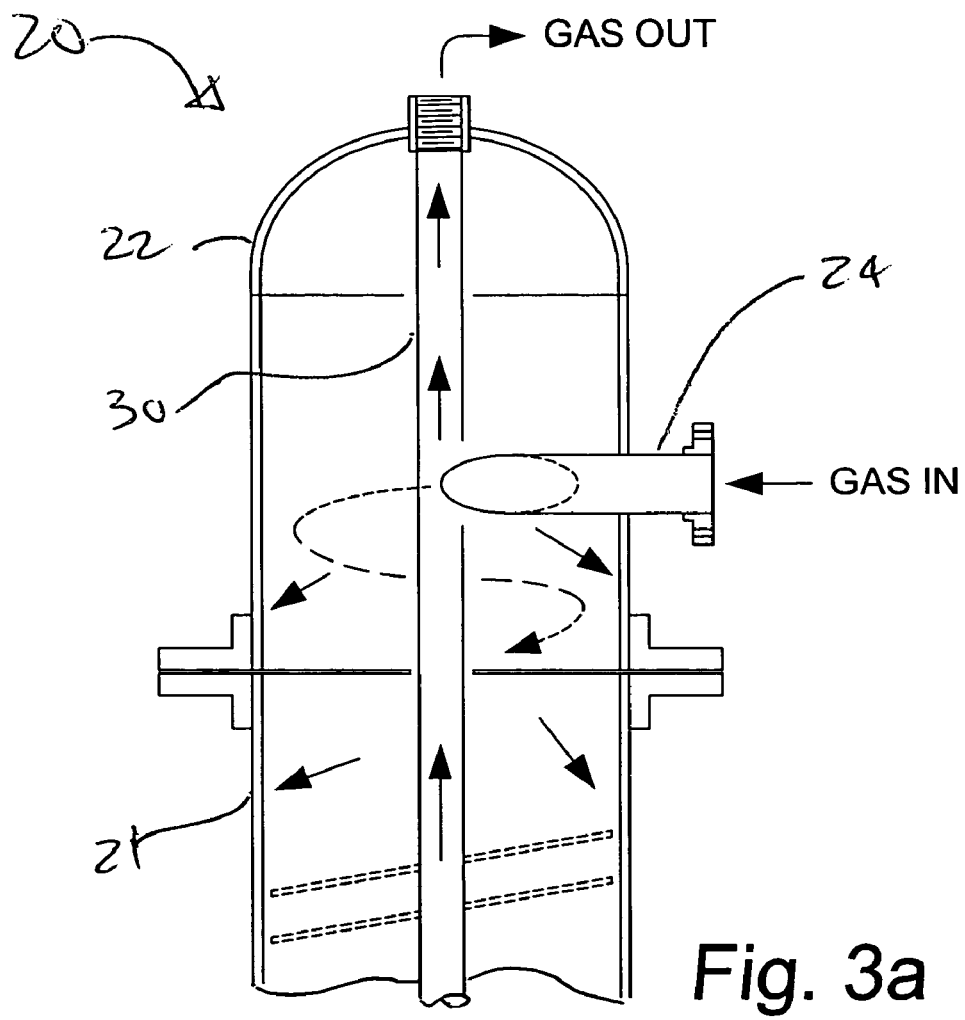

Each separator 20 comprises a cylindrical vessel 21 having a top end 22, a bottom end 23 and side walls 25. As shown in FIGS. 3a and 3b, a tangential gas inlet 24 is fit to the top end 22 for imparting cyclonic action to the incoming wet gas stream.

A base plate 29, spaced downstream and below the tangential gas inlet 24, divides the vessel 21 into a cyclonic upper separation section G and a lower liquid storage section L.

The upper separation section G comprises a centrifugal or cyclonic section C above a liquid trapping section T. The wet gas stream travels downwardly through the upper separation section G from the gas inlet 24 in a spinning motion towards the bottom end 23 of the vessel 21 and base plate 29. Liquid contained therein concentrates adjacent the side walls 25. As necessary, the spinning motion of the gas stream is further encouraged using one or more helical vanes 26 spaced along the cyclonic section C.

Optionally, and typically where liquid loading is light, a thin layer or annular blanket 50 of high surface area contacting material or packing 51, such as felt, resides adjacent the side walls 25 for capturing released liquid and conducting the liquid to the liquid trapping section T. The blanket 50 extends upwardly from the liquid trapping section T and along the vessel side walls 25. The packing 51 is retained adjacent the vessel side wall by a mesh frame 52 which enables maximal communication between the wet gas stream and the packing. Cyclonic action engages the majority of moisture and mists with the annular packing 51 which then drains down the packing to the liquid trapping section T. The mesh frame 52 can be suspended from the helical vanes 26 or additionally upon the liquid trapping section T.

The liquid trapping section T comprises one or more cylindrical shells 42,42 . . . which extend upwardly from the base plate 29 and which are spaced from each other 42,42 and can also be spaced from the side walls 25 for forming one or more annular cavities 43 therebetween. A substantially dry gas entrance 31 is located generally centrally and adjacent the base plate 29. The dry gas entrance 31 is shielded from the upper separation section G by a laterally extending barrier or deflector 40 having gas flow bypass 41 formed about its periphery. The deflector 40 maximizes exposure of the gas stream and separated liquids remain outwardly and maximally exposed to the annular cavities 42,42 . . . before a substantially dry gas is re-directed radially inwardly to the dry gas entrance.

The shells 42 are spaced from the vessel side walls 25 and from one another 42,42,42 . . . , each of the one or more shells 42 being arranged successively from an outermost shell adjacent the vessel's side walls 25 to an innermost shell spaced from the gas inlet 31. As stated, the cyclonic action concentrates liquids from the gas stream radially outwards towards the vessel's side walls 25. Liquids adjacent the vessel side walls 25, and those which may diminish in a gradient radially inward, are captured in the successive annular cavities 43,43 . . . .

In embodiment applied in operation on light loadings, few shells 42 are required. For the treatment of moist air, one may use a solitary cylindrical shell forming a single annular cavity between the side walls 25 and the shell 42.

In another the embodiment, as shown, each successively and radially inwardly spaced shell 42, having an ever decreasing radius, has a corresponding diminishing height. Accordingly a gas stream, having released much of its liquid content, approaches the gas outlet 31 and is more-and-more constricted radially by a conical and reducing vessel volume, the gas stream traversing each annular cavity 43 for additional liquid capture therein and wherein a drier gas stream results with is discharged through the gas outlet 31 and out of the vessel.

Figure 6:
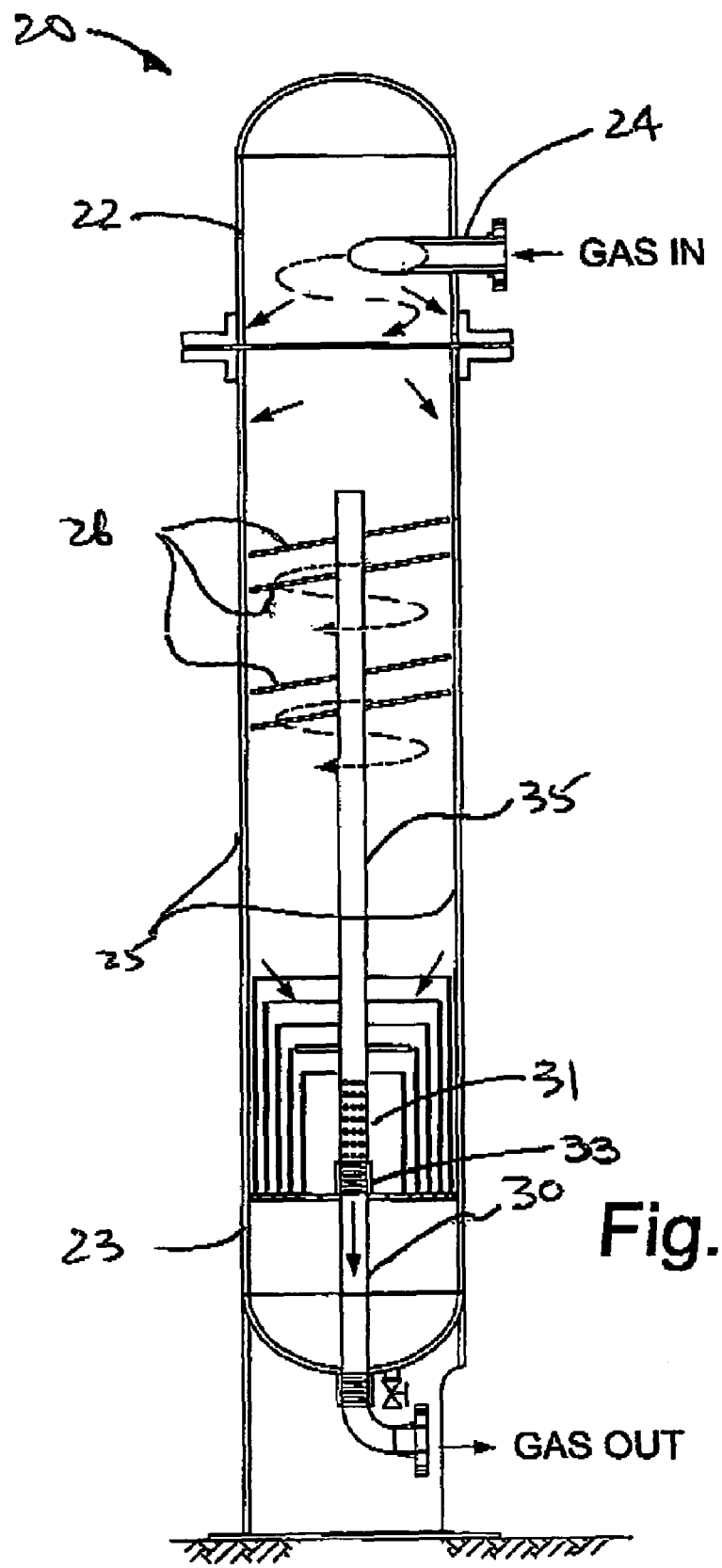
FIG. 6 is a cross-sectional view of a separator according to another embodiment of the invention which illustrates cyclone separation apparatus having a lower end gas outlet from the vessel.

In one embodiment shown in FIG. 2a, a discharge conduit 30 extends out of the top end 22 of the vessel 21 such as for transfer of the drier gas stream to additional stages of separators 20 or collection. The discharge conduit 30 extends along the axis of the vessel 21 between a bottom end 33 at the gas outlet 31 adjacent the base plate 29 and a top end 32 at the vessel's top end 22. In another embodiment shown in FIG. 6, the drier gas stream is discharged from the bottom end 23 of the vessel 21. In this case the discharge conduit 30 is directed downwardly. If helical vanes are employed, a dummy support member 35 extends upwardly from the liquid trapping section T.

Figure 4B:
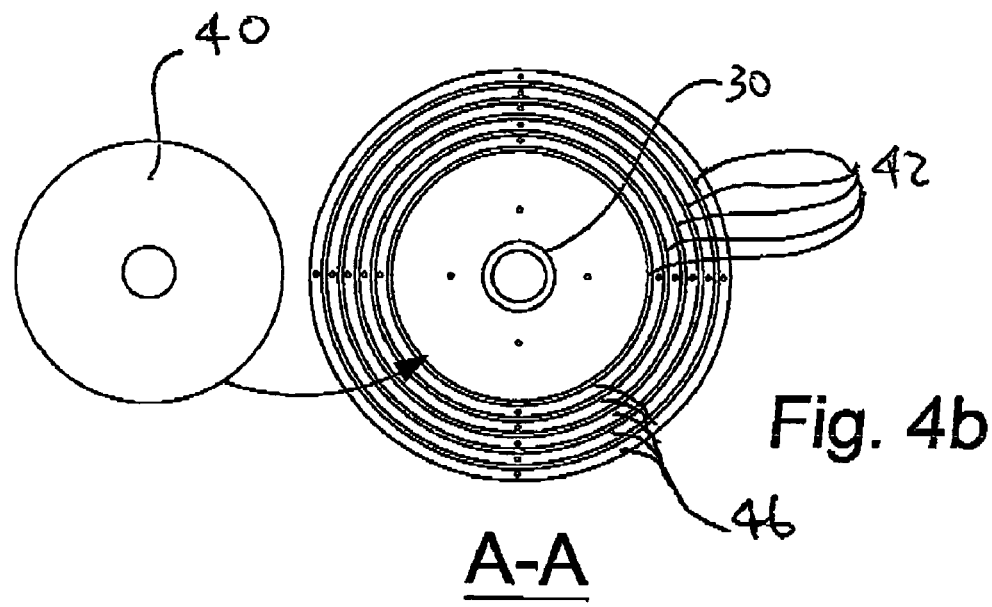
FIGS. 4a and 4b are cross-sectional views of the base of the vessel of FIG. 2a and illustrating a side and a top views respectively of the concentric shells section and the dry gas discharge conduit.
Figure 4A:
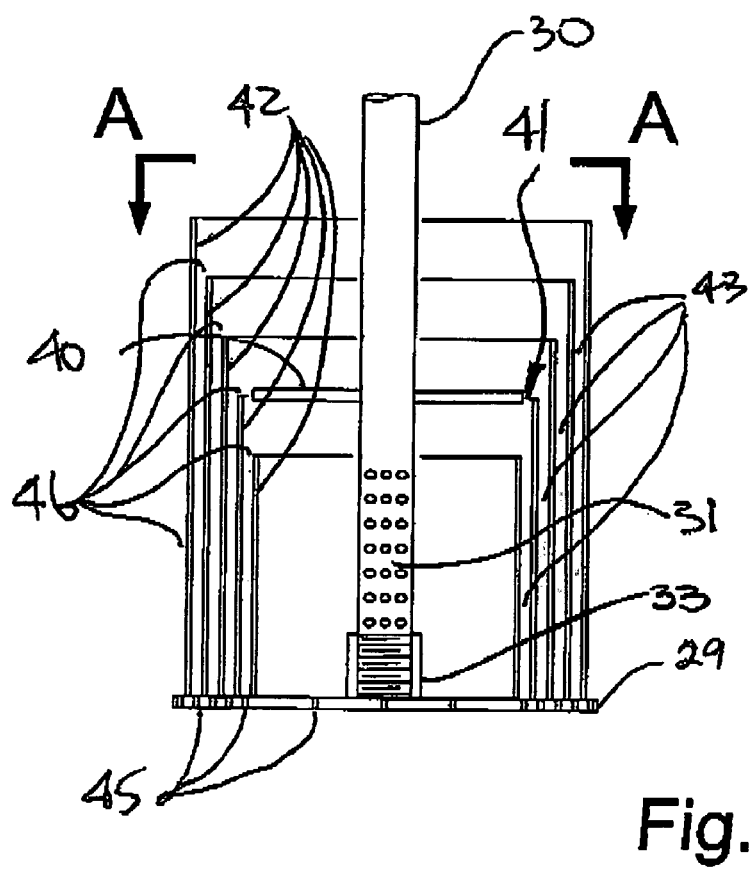
Figure 5:
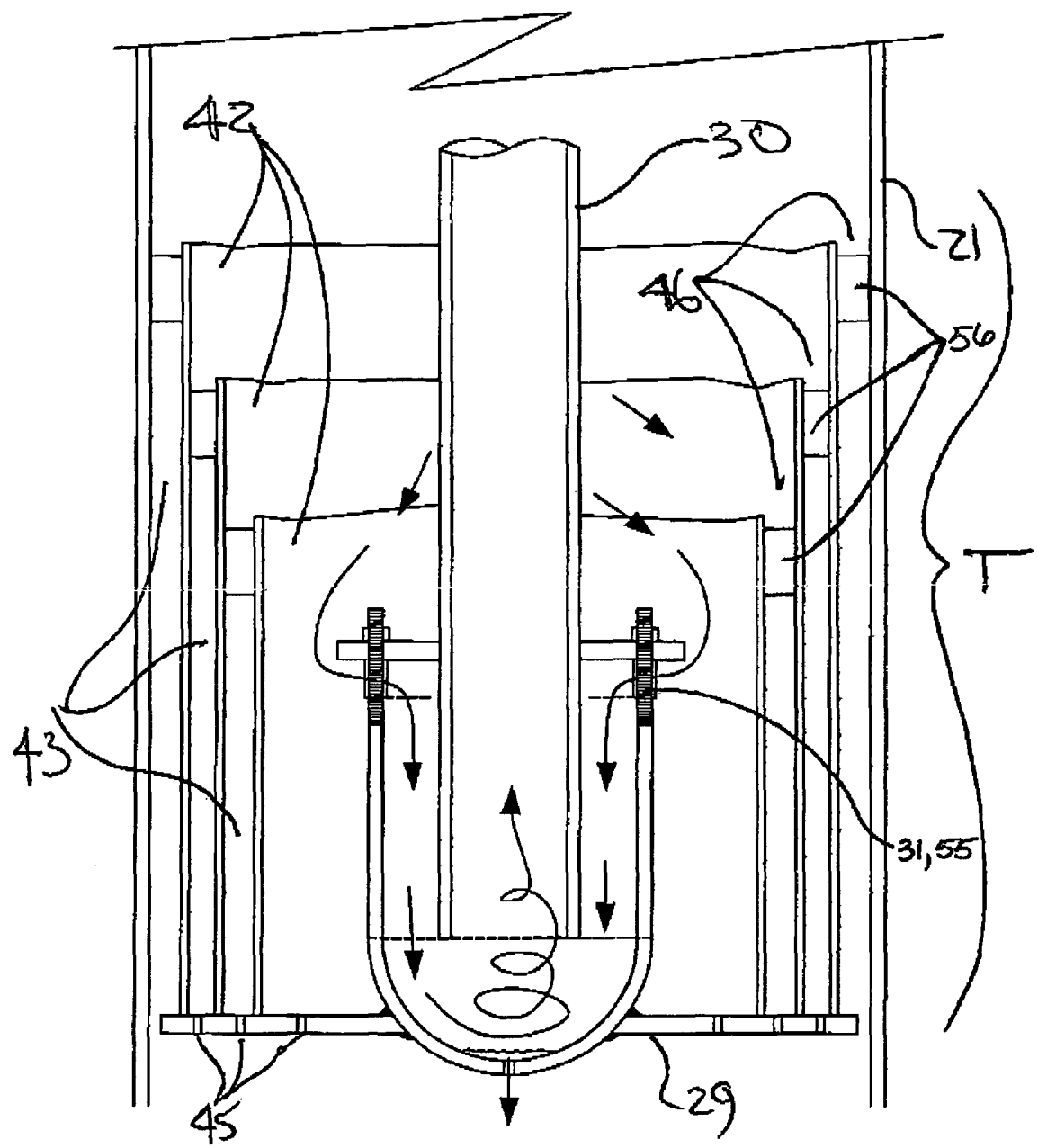
FIG. 5 is a partial cross-sectional view of another embodiment of the concentric shells section and the dry gas discharge conduit.

Various embodiments of the shells 42 are shown in FIGS. 4a,4b and in FIG. 5. As shown in FIGS. 4a and 4b, each shell 42 extends upwards from the base plate 29. Typically, the shells 42 would be nested concentrically. Each annular cavity 43 is formed between each adjacent pair of shells 42 and has an open end 46. In one aspect, the annular cavities 43 result in a quieting of the gas stream and permit the centrifugally separated liquids to fall-out of suspension and avoid re-entrainment. As the separation of liquids by centrifugal force is a continuum, occurring at a maximum at the vessel side 25 wall and a minimum at the central axis, the series of shells 42,42 and annular cavities 25,43 and 43,43 collect liquid from a plurality of radial locations in the spinning gas stream, The base plate 29 adjacent each annular cavities 43 is lit with a plurality of drain holes 45 to enable the emptying of each cavities into the liquid collection section L below the shells 42 and base plate 29.

With reference to FIG. 5, an alternate embodiment of the gas outlet 31 is shown. The deflector 40 is incorporated into a sump affixed to the base plate 29. A plurality of entrances 55 are formed in the sump, below the deflector 40. An variation on the number of cylindrical shells is also illustrated, having three concentric shells 42,42,42 and having spacer elements 56 between the vessel 21 and between adjacent shells 42,42.

The separator of the present invention can be manufactured as a component of a custom vessel or a retrofit to an existing vessel 21. With reference to FIG. 2b, the base plate 29, concentric shells 42,42, and discharge conduit 30 can be fabricated as an insert 49 for installation into a typical gas processing vessel having a tangential gas inlet 24. The base plate 29 is supported from the bottom end 33 of the discharge conduit 30. Further, as shown only in FIG. 2a, the helical vanes 26 and mesh 50 can be manufactured as part of the insert 49. A vessel 21 can include a connection 60 between the top end 22 and the bottom end 23 which enables opening the vessel 21 for installation of the insert 49. Typically, for pressure vessels, a flanged connection 61 can be employed. Further, connection 60 enables insertion of an additional cylindrical spool (not shown) which can be provided as desired to increase separation distance above the base plate 29.

Accordingly, one can retrofit an approved or regulated vessel with the apparatus of the invention without a need for manufacture of a custom vessel which may require re-certification.

With reference to FIG. 2a, the illustrated separator is suitable for ASME code up to 1440 psi service and was designed for processing up to 6 million cubic feet of natural gas per day and has the following specifications: 12 inch inside diameter pipe having hemispherical heads for an overall height of about 10 feet. As shown, five cylindrical shells of 12 gauge material have the following diameters spaced sequentially from the side walls: 11, 10, 9, 8, and 6 inch. Each shell 42,42,42,42,42 has a different height measured from the base plate 26, respectively: 16, 14, 12, 10, and 8 inches. A seven inch diameter deflector plate 40 is supported on a 2 inch discharge conduit 30. The gas outlet 31 can be formed of approximately forty-eight ⅜ inch holes drilled in the discharge conduit 30 adjacent the base plate 29. An annular blanket 50 is formed of ½ inch of felt 51 supported in a 20 gauge expanded metal mesh frame 52. A plurality of ¼ inch drain holes 45 were provided along radial quadrants in the base plate 29 outside the outermost of the shells 42, between each shell 42,42 and inside the innermost of the shells 42.

EXAMPLES

A smaller yet similarly proportioned separator according to FIG. 2a, was tested for removing air from compressed air. Such a separator, being 7 foot tall and 6⅝ inch diameter was tested on 185 scfm air at 100 psig. Only one shell adjacent the side walls was utilized and a felt annular blanket was installed. Ambient air at 43 F and 74–82% humidity was compressed to 100 psig and 84 F and treated through the separator. A drier gas stream exited the vessel at 5% relative humidity and 55 F. The liquid recovery was 29 ounces in 2 hours.

In another test on the same unit, drier ambient air was tested with the addition of supplementary water. Ambient air at 56 F and 54% humidity was compressed to 100 psig and 90 F. Over a two hour period, 72 ounces of water were added to the compressed gas stream and treated through the separator. The liquid recovery was 98 ounces in 2 hours or a recovery of 26 ounces from the air stream. A drier gas stream exited the vessel at 65 F.

Application of the apparatus and methodology disclosed herein results in significant savings over known dehydrator technology.

The embodiments of the invention for which and exclusive property or privilege is claimed are defined as follows:

1. Apparatus for treating a gas stream containing liquid and being adapted to a vessel having cylindrical side walls, a bottom end, and a tangential gas inlet adjacent a top end, the apparatus comprising:
    a base plate positioned below the tangential gas inlet;
    at least one cylindrical shell arranged on the base plate and adjacent the wall portion for forming at least one annular cavity extending upwardly from the base plate and having an open end for receiving liquid therein;
    an opening in the base plate at each annular cavity for draining liquid from the at least one annular cavity;
    an outlet for the gas stream positioned adjacent the base plate and within the annular shells; and
    a plate above the gas outlet for directing the gas stream over the one or more annular cavities before a drier gas stream is removed through the gas outlet,
    wherein the base plate divides the vessel into an upper gas cyclonic separation portion above the base plate and a lower liquid storage portion for receiving liquid from the one or more openings in the base plate.

2. The apparatus of claim 1 wherein an annular cavity is formed between the vessel side wall and one of the at least one cylindrical shell.

3. The apparatus of claim 2 wherein there are two or more cylindrical shells, one within another, and being spaced successively and radially inward from an outermost cylindrical shell to an innermost cylindrical shell and forming annular cavities therebetween.

4. The apparatus of claim 3 wherein each radially inward and successive shell has a lesser height.

5. The apparatus of claim 1 further comprising an annular blanket adjacent the side walls and extending for at least a portion of the side walls between the tangential gas inlet and the open end of at least one cylindrical shell.

6. The apparatus of claim 1 further comprising a conduit extending from the gas outlet for directing the drier gas stream out of the vessel.

7. The apparatus of claim 6 wherein the conduit extends along an axis of the vessel and directs drier gas stream out of the top end of the vessel.

8. The apparatus of claim 7 wherein:
    the conduit has a top end suspended from the top end of the vessel; and
    the base plate is suspended from a bottom end of the conduit.

9. The apparatus of claim 8 further comprising:
    an insert for the vessel, the insert comprising the conduit, base plate and cylindrical shells arranged thereon.

10. The apparatus of claim 9 wherein the insert further comprises an annular blanket adapted for residing adjacent the side walls and extending for at least a portion of the side walls between the tangential gas inlet and the open end of at one least cylindrical shell.

11. A treatment vessel having cylindrical side walls, a bottom end, and a tangential gas inlet adjacent a top end and having the apparatus of claim 1 arranged therein.

12. Apparatus for treating a gas stream containing liquid comprising:
    an insert adapted for installation into a cylindrical vessel having a bottom end and having a tangential gas inlet adjacent a top end for spinning the gas stream, the insert having a bottom end and a top end;
    a base plate at a bottom end of the insert;
    one or more cylindrical annular shells arranged on the base plate, the first of the shells positioned adjacent the vessel for forming at least one annular cavity extending upwardly from the base plate for receiving liquid therein;
    one or more openings in the base plate at each annular cavity for draining liquid from each annular cavity;
    an outlet for the gas stream positioned adjacent the base plate and within the annular shells; and
    a plate for directing the spinning gas stream over the annular shells before a drier gas stream is removed through the gas outlet,
    wherein the base plate divides the vessel into an upper gas cyclonic separation portion above the base plate and a lower liquid storage portion for receiving liquid from the one or more openings in the base plate.

13. The apparatus of claim 12 wherein the insert further comprises a conduit extending from a top end of the insert to the bottom end of the insert.

14. The apparatus of claim 13 wherein the conduit extends along an axis of the vessel to the top end of the vessel for directing a drier gas stream out of the vessel.

15. The apparatus of claim 14 wherein:
    the conduit is suspended from the top end of the vessel; and the base plate is suspended from a bottom end of the conduit.

16. The apparatus of claim 12 wherein there are two or more cylindrical shells, one within another, and being spaced successively and radially inward from an outermost shell to an innermost shell and forming annular cavities therebetween.

17. The apparatus of claim 16 wherein each radially inward and successive shell has a lesser height.

18. The apparatus of claim 12 wherein the insert further comprises an annular blanket adapted for residing adjacent the side walls and extending for at least a portion of the side walls between the tangential gas inlet and the open end of at one least cylindrical shell.

\* \* \* \* \*